(12) United States Patent
Butcher et al.

(10) Patent No.: US 10,360,167 B1
(45) Date of Patent: Jul. 23, 2019

(54) SYSTEMS AND METHODS FOR USING A BUS EXCHANGE SWITCH TO CONTROL PROCESSOR AFFINITY

(71) Applicant: Dell Products L.P., Round Rock, TX (US)

(72) Inventors: Wade Andrew Butcher, Cedar Park, TX (US); Sandor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/876,477

(22) Filed: Jan. 22, 2018

(51) Int. Cl.
*G06F 13/40* (2006.01)
*G06F 13/42* (2006.01)

(52) U.S. Cl.
CPC ...... *G06F 13/4022* (2013.01); *G06F 13/4068* (2013.01); *G06F 13/4282* (2013.01);
(Continued)

(58) Field of Classification Search
CPC .... G06F 9/4405; G06F 11/3006; G06F 13/40; G06F 13/4022; G06F 13/4027; G06F 13/4063; G06F 13/4068; G06F 13/4081; G06F 13/409; G06F 13/4221; G06F 13/4265; G06F 13/4282; G06F 15/16; G06F 15/161; G06F 15/163; G06F 15/17; G06F 15/177; G06F 2213/0026; G06F 2213/4002
See application file for complete search history.

(56) References Cited

U.S. PATENT DOCUMENTS 6,998,870 B1 * 2/2006 Gulick ............... H04L 25/0278
326/26
7,512,731 B2 * 3/2009 Yang ................... G06F 13/4027
710/104
(Continued)

OTHER PUBLICATIONS

Dowler, Mike. "What does PCI Express mean to your PC?" PCSTATS. Online Dec. 11, 2003. Retrieved from Internet Oct. 12, 2018. <http://www.pcstats.com/articleview.cfm?articleid=1087&page=2>. (Year: 2003).*
(Continued)

*Primary Examiner* — Thomas J Cleary
(74) *Attorney, Agent, or Firm* — Jackson Walker L.L.P.

(57) ABSTRACT

In accordance with embodiments of the present disclosure, an information handling system may include two processor sockets comprising a first processor socket and a second processor socket, a first information handling resource communicatively coupled to the first processor socket, second information handling resource, and a bus exchange switch communicatively coupled to the first processor socket, the second processor socket, and the second information handling resource such that: if the second processor socket is unpopulated, the bus exchange switch creates a first electrically conductive path between the first processor socket and the second information handling resource, and if the second processor socket is populated, the bus exchange switch creates a second electrically conductive path between the first processor socket and the second processor socket and creates a third electrically conductive path between the second processor socket and the second information handling resource.

15 Claims, 3 Drawing Sheets

(52) U.S. Cl.
CPC .............. *G06F 2213/0026* (2013.01); *G06F 2213/4002* (2013.01)

(56) References Cited

U.S. PATENT DOCUMENTS

| | | | | | |
|---|---|---|---|---|---|
| 7,596,650 | B1* | 9/2009 | Aditya | ................ | G06F 13/4004 |
| | | | | | 710/11 |
| 8,001,310 | B2* | 8/2011 | Wheeler | ............. | G06F 13/4072 |
| | | | | | 709/249 |
| 2005/0080978 | A1* | 4/2005 | Kelley | ................ | G06F 13/4027 |
| | | | | | 710/317 |
| 2006/0080484 | A1* | 4/2006 | Lefebvre | ................ | G06F 15/16 |
| | | | | | 710/104 |
| 2006/0129732 | A1* | 6/2006 | Tsai | .................... | G06F 13/4027 |
| | | | | | 710/305 |
| 2007/0143520 | A1* | 6/2007 | Yang | .................. | G06F 13/4027 |
| | | | | | 710/306 |
| 2008/0256222 | A1* | 10/2008 | Wilson | ................ | G06F 13/4022 |
| | | | | | 709/222 |
| 2011/0197012 | A1* | 8/2011 | Liao | .................... | G06F 13/4022 |
| | | | | | 710/316 |
| 2013/0326039 | A1* | 12/2013 | Shah | ........................ | H04L 41/04 |
| | | | | | 709/223 |
| 2016/0026589 | A1* | 1/2016 | Kolor | .................. | G06F 13/4022 |
| | | | | | 710/313 |
| 2018/0123831 | A1* | 5/2018 | Sufleta | .................... | H04L 12/56 |

OTHER PUBLICATIONS

Gopalakrishnan, Narayanan. "Hot-Plugging CPU's to conserve power." linuxforthenew. Online Jan. 2, 2013. Retrieved from Internet Oct. 12, 2018. <http://linuxforthenew.blogspot.com/2013/01/hot-plugging-cpus-to-conserve-power.html>. (Year: 2013).* https://www.diodes.com/products/connectivity-and-timing/switches-mux/bus-switches/.

Hegde, Anupama, IDT Bus Switch Characterics and Applications, Application Note AN-157, Integrated Device Technology, Inc., 1996, 6 pages.

Pericom Semiconductor Corporation, Zero-Delay Bus Switches, Application Note 1, Mar. 11, 2002, 19 pages.

* cited by examiner

SYSTEMS AND METHODS FOR USING A BUS EXCHANGE SWITCH TO CONTROL PROCESSOR AFFINITY

TECHNICAL FIELD

The present disclosure relates in general to information handling systems, and more particularly to methods and systems for using a bus exchange switch to control processor affinity in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A recognized problem in the industry occurs in two socket servers in which network or storage input/output (I/O) devices connected to one processor are more slowly accessed by the second processor in the system. Inter-socket connections are often used for memory accesses on one or more neighboring processors and their associated peripherals, leading to what is known as the (non-uniform memory access) NUMA problem. Often the problem is not purely a bandwidth concern on the inter-socket bus, but rather a latency and flow control problem.

A more narrow and specific problem is the availability of Peripheral Component Interconnect Express (PCIe) lanes to service an access controller (e.g., baseband management controller or remote access controller) and a network interface (e.g., a LAN-on-motherboard or LOM) in an information handling system. In a particular generation of processors, two extra lanes per processor may be available. With the two extra lanes in a single socket system, an access controller and network interface can be connected to a processor residing in the socket. However, in a two-socket system, one of these lanes may be partially reserved for processor-to-processor handshaking protocols, leaving only one lane per processor. This forces a system designer to make a choice: connect the network interface to the second processor, or bifurcate a wider bus for this purpose (e.g., a x16 PCIe port). The latter is an unattractive choice because it minimizes one of the advantages of the multi-socket system—more I/O that can be directly connected to the processor. And if the former approach is chosen, a one-processor configuration of the two-socket machine is left without a network interface.

SUMMARY

In accordance with the teachings of the present disclosure, the disadvantages and problems associated with existing approaches to controlling processor affinity to peripheral devices may be reduced or eliminated.

In accordance with embodiments of the present disclosure, an information handling system may include two processor sockets comprising a first processor socket and a second processor socket, a first information handling resource communicatively coupled to the first processor socket, second information handling resource, and a bus exchange switch communicatively coupled to the first processor socket, the second processor socket, and the second information handling resource such that: if the second processor socket is unpopulated, the bus exchange switch creates a first electrically conductive path between the first processor socket and the second information handling resource, and if the second processor socket is populated, the bus exchange switch creates a second electrically conductive path between the first processor socket and the second processor socket and creates a third electrically conductive path between the second processor socket and the second information handling resource.

In accordance with these and other embodiments of the present disclosure, a method may be provided in an information handling system comprising two processor sockets comprising a first processor socket and a second processor socket, a first information handling resource communicatively coupled to the first processor socket, a second information handling resource, and a bus exchange switch communicatively coupled to the first processor socket, the second processor socket, and the second information handling resource. The method may include creating, by the bus exchange switch, a first electrically conductive path between the first processor socket and the second information handling resource if the second processor socket is unpopulated, and creating, by the bus exchange switch, a second electrically conductive path between the first processor socket and the second processor socket and a third electrically conductive path between the second processor socket and the second information handling resource if the second processor socket is populated.

In accordance with these and other embodiments of the present disclosure, a bus exchange switch may be configured to operate in an information handling system comprising two processor sockets comprising a first processor socket and a second processor socket, a first information handling resource communicatively coupled to the first processor socket, a second information handling resource, and a bus exchange switch communicatively coupled to the first processor socket, the second processor socket, and the second information handling resource. The bus exchange switch may be configured to create a first electrically conductive path between the first processor socket and the second information handling resource if the second processor socket is unpopulated, and create a second electrically conductive path between the first processor socket and the second processor socket and a third electrically conductive path between the second processor socket and the second information handling resource if the second processor socket is populated.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
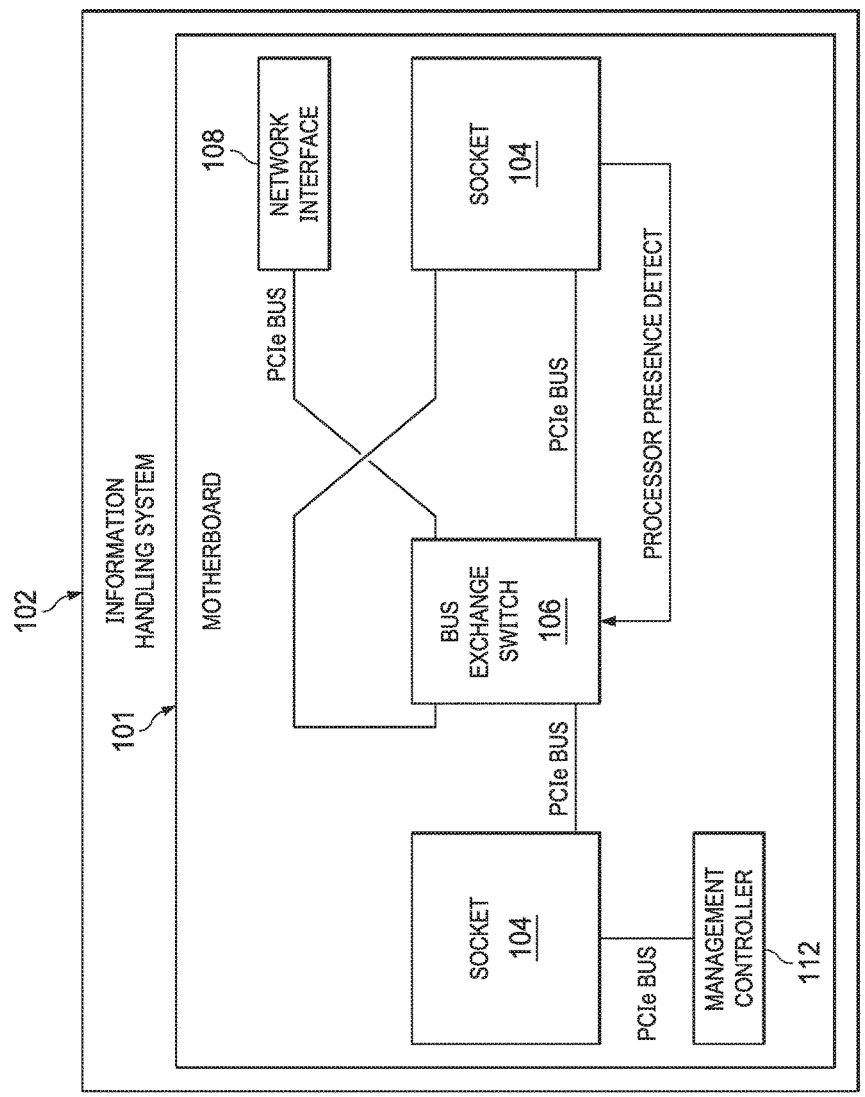
FIG. 1 illustrates a block diagram of an example information handling system, in accordance with embodiments of the present disclosure.
Figure 2:
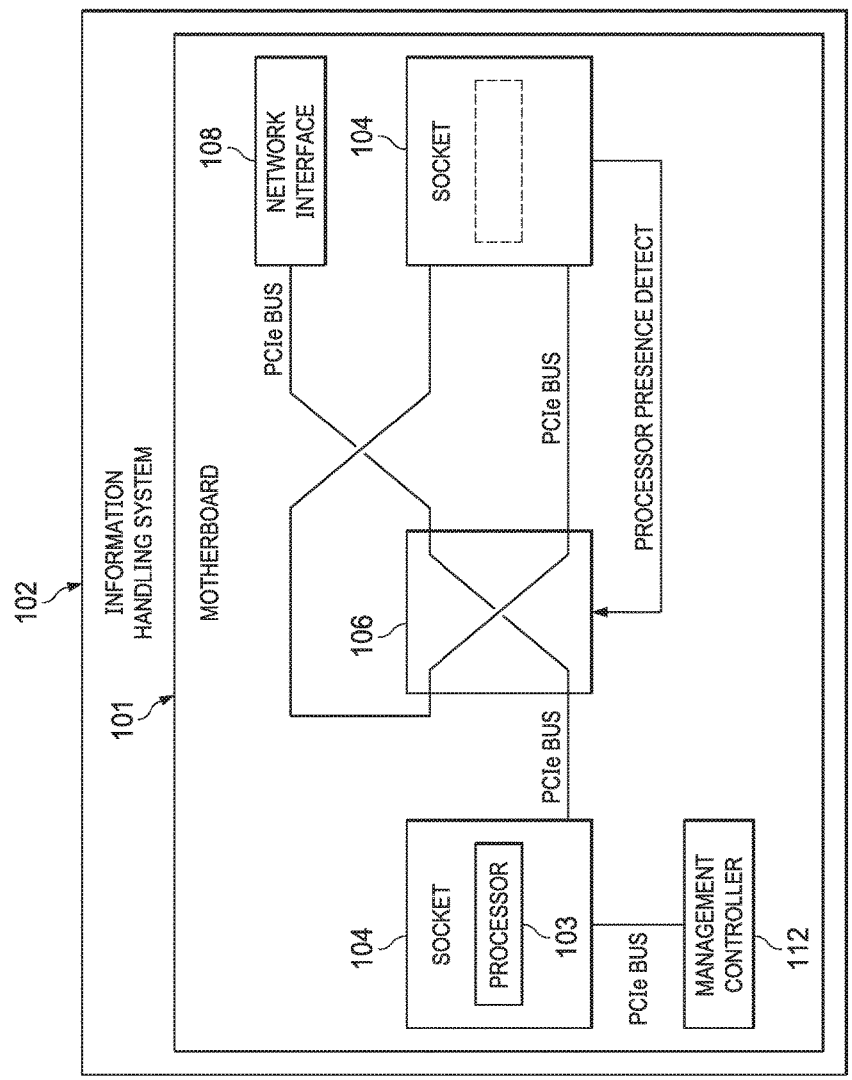
FIG. 2 illustrates a block diagram of the example information handling system depicted in FIG. 1 with one of its sockets unpopulated, in accordance with embodiments of the present disclosure.
Figure 3:
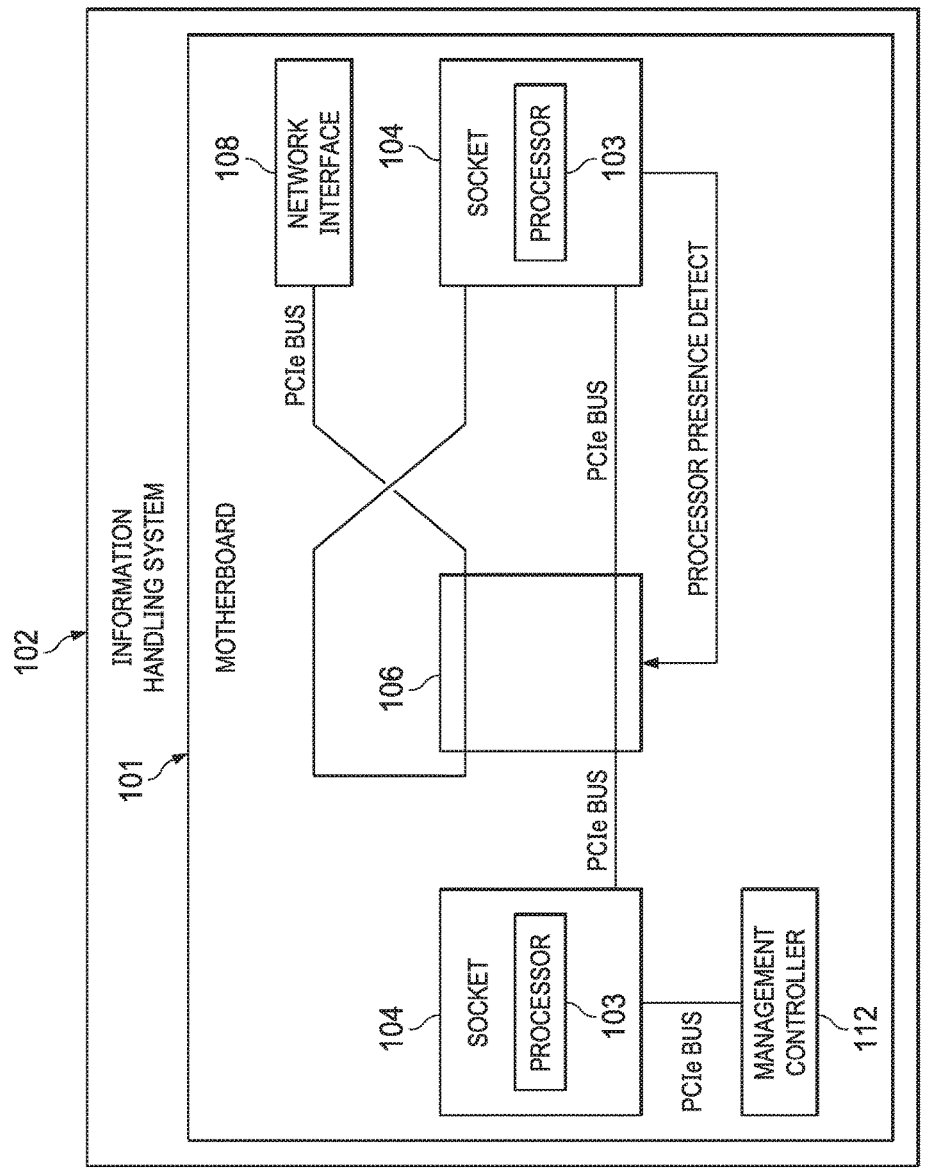
FIG. 3 illustrates a block diagram of the example information handling system depicted in FIG. 1 with both of its sockets populated, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an information handling system 102. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a motherboard 101. Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a plurality of sockets 104, a bus exchange switch 106, a network interface 108, and a management controller 112.

Each socket 104 may comprise any suitable system, device, or apparatus for electrically and mechanically mating a processor 103 (see FIGS. 2 and 3) to motherboard 101. A processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory and/or another component of information handling system 102.

Bus exchange switch 106 may comprise any suitable system, device, or apparatus the configured for switching connectivity among devices coupled to bus exchange switch 106 responsive to a switch control signal. In particular, bus exchange switch 106 may have one control port for receiving a control signal and four switch ports and may be configured such that when the switch control signal is enabled, a conductive path is formed between a first switch port and a third switch port of bus exchange switch 106 and a conductive path is formed between a second switch port and a fourth switch port of bus exchange switch 106, and when the switch control signal is disabled, a conductive path is formed between the first switch port and the fourth switch port of bus exchange switch 106 and a conductive path is formed between the second switch port and the third switch port of bus exchange switch 106.

Network interface 108 may comprise any suitable system, apparatus, or device operable to serve as an interface between information handling system 102, a network, and/or one or more other information handling systems. Network interface 108 may enable information handling system 102 to communicate using any suitable transmission protocol and/or standard. In these and other embodiments, network interface 108 may comprise a local area network (LAN)-on-motherboard (LOM).

Management controller 112 may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, the components of motherboard 101 may be arranged such that management controller 112 is coupled via a first PCIe lane of a first socket 104, the first switch port of bus exchange switch 106 is coupled via a PCIe bus to a second PCIe lane of the first socket 104, the second switch port of bus exchange switch 106 is coupled via a first PCIe lane of a second socket 104, the third switch port of bus exchange switch 106 is coupled via a second PCIe lane of the second socket 104, and the fourth switch port of bus exchange switch 106 is coupled via a PCIe lane to network interface 108. As also shown in FIG. 1, the second socket 104 may generate a processor presence detect signal indicating the presence of a processor in the second socket which may be received as the control signal of bus exchange switch 106.

In operation, as shown in FIG. 2, when the second socket 104 is unpopulated, the processor presence detect signal may be disabled such that bus exchange switch 106 creates an electrically conductive path between the first switch port and the fourth switch port of bus exchange switch 106 and an electrically conductive path between the second switch port and the third switch port of bus exchange switch 106. As a result, a processor 103 received in socket 104 may be coupled via its first PCIe lane to management controller 112 and via its second PCI lane to network interface 108 via bus exchange switch 106, thus allowing processor 103 received in the first socket 104 to access both management controller 112 and network interface 108 in the absence of a processor populated in the second socket 104. In addition, bus exchange switch 106 may create an electrically conductive path between the first PCIe lane of the second socket 104 and the second PCIe lane of the second socket 104, but the existence of such path may be irrelevant given that the second socket 104 is unpopulated.

In addition, as shown in FIG. 3, when the first socket 104 and the second socket 104 are unpopulated, the processor presence detect signal may be enabled such that bus exchange switch 106 creates an electrically conductive path between the first switch port and the third switch port of bus exchange switch 106 and an electrically conductive path between the second switch port and the fourth switch port of bus exchange switch 106. As a result, bus exchange switch 106 may create an inter-socket communications bus between processors 103 received in sockets 104 via the first PCIe lane of the first socket 104 and the first PCIe lane of the second socket 104. Further, bus exchange switch 106 may couple network interface 108 to the second socket 104. Accordingly, each processor 103 can ultimately receive access to network interface 108 and management controller 112: processor 103 in the first socket 104 may be directly interfaced with management controller 112 and may access network interface 108 via processor 103 in the second socket 104, and processor 103 in the second socket 104 may be directly interfaced with network interface 108 and may access management controller 112 via processor 103 in the second socket 104.

In some embodiments, bus interface switch 106 may respond to hot plug events, meaning bus interface switch 106 may react to an insertion or removal of processor 103 from the second socket 104.

In these and other embodiments, a migration of a software process from one processor 103 to another may trigger a hot plug or similar event, and bus interface switch 106 may respond to such event, meaning bus interface switch 106 may react to a software process migrating between processors. In such embodiments, bus interface switch 106 may consider a socket 104 populated or unpopulated not based on whether a processor 103 resides in such socket 104, but based upon whether a particular software processor is running within a processor 103 residing in such socket.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   two processor sockets comprising a first processor socket and a second processor socket;
   a first information handling resource communicatively coupled to the first processor socket;
   a second information handling resource; and
   a bus exchange switch communicatively coupled to the first processor socket, the second processor socket, and the second information handling resource such that:
   in response to the second processor socket being unpopulated, the bus exchange switch is configured to create a first electrically conductive path between the first processor socket and the second information handling resource and is further configured to create an electrically conductive loop path between a first portion of the unpopulated second processor socket and a second portion of the unpopulated second processor socket; and in response to the second processor socket being populated, the bus exchange switch is configured to create a second electrically conductive path between the first processor socket and the second processor socket and is further configured to create a third electrically conductive path between the second processor socket and the second information handling resource;

wherein a determination of whether or not a particular processor socket is populated is based upon whether a particular software process is executing on a processor residing in such processor socket.

2. The information handling system of claim 1, wherein the first information handling resource is a management controller.

3. The information handling system of claim 2, wherein the second information handling resource is a network interface.

4. The information handling system of claim 1, wherein the bus exchange switch is configured to operate in a hot-pluggable manner to switch between the first electrically conductive path on one hand and the second electrically conductive path and the third electrically conductive path on the other hand in response to population of the second processor socket, and switch between the second electrically conductive path and the third electrically conductive path on one hand and the first electrically conductive path on the other hand in response to depopulation of the second processor socket.

5. The information handling system of claim 1, wherein the first information handling resource is communicatively coupled to the first processor socket and the bus exchange switch is communicatively coupled to the first processor socket, the second processor socket, and the second information handling resource via respective Peripheral Component Interconnect Express lanes.

6. A method comprising, in an information handling system comprising two processor sockets comprising a first processor socket and a second processor socket, a first information handling resource communicatively coupled to the first processor socket, a second information handling resource, and a bus exchange switch communicatively coupled to the first processor socket, the second processor socket, and the second information handling resource:

creating, by the bus exchange switch, a first electrically conductive path between the first processor socket and the second information handling resource if the second processor socket is unpopulated, and further creating an electrically conductive loop path between a first portion of the unpopulated second processor socket and a second portion of the unpopulated second processor socket;

and creating, by the bus exchange switch, a second electrically conductive path between the first processor socket and the second processor socket and a third electrically conductive path between the second processor socket and the second information handling resource if the second processor socket is populated;

wherein a determination of whether or not a particular processor socket is populated is based upon whether a particular software process is executing on a processor residing in such processor socket.

7. The method of claim 6, wherein the first information handling resource is a management controller.

8. The method of claim 7, wherein the second information handling resource is a network interface.

9. The method of claim 6, further comprising operating, by the bus exchange switch, in a hot-pluggable manner to switch between the first electrically conductive path on one hand and the second electrically conductive path and the third electrically conductive path on the other hand in response to population of the second processor socket, and switch between the second electrically conductive path and the third electrically conductive path on one hand and the first electrically conductive path on the other hand in response to depopulation of the second processor socket.

10. The method of claim 6, wherein the first information handling resource is communicatively coupled to the first processor socket and the bus exchange switch is communicatively coupled to the first processor socket, the second processor socket, and the second information handling resource via respective Peripheral Component Interconnect Express lanes.

11. A bus exchange switch configured to, in an information handling system comprising two processor sockets comprising a first processor socket and a second processor socket, a first information handling resource communicatively coupled to the first processor socket, and a second information handling resource, wherein the bus exchange switch is communicatively coupled to the first processor socket, the second processor socket, and the second information handling resource:

create a first electrically conductive path between the first processor socket and the second information handling resource in response to the second processor socket being unpopulated, and further create an electrically conductive loop path between a first portion of the unpopulated second processor socket and a second portion of the unpopulated second processor socket; and create a second electrically conductive path between the first processor socket and the second processor socket and a third electrically conductive path between the second processor socket and the second information handling resource in response to the second processor socket being populated;

wherein a determination of whether or not a particular processor socket is populated is based upon whether a particular software process is executing on a processor residing in such processor socket.

12. The bus exchange switch of claim 11, wherein the first information handling resource is a management controller.

13. The bus exchange switch of claim 12, wherein the second information handling resource is a network interface.

14. The bus exchange switch of claim 11, further configured to operate in a hot-pluggable manner to switch between the first electrically conductive path on one hand and the second electrically conductive path and the third electrically conductive path on the other hand in response to population of the second processor socket, and switch between the second electrically conductive path and the third electrically conductive path on one hand and the first electrically conductive path on the other hand in response to depopulation of the second processor socket.

15. The bus exchange switch of claim 11, wherein the first information handling resource is communicatively coupled to the first processor socket and the bus exchange switch is communicatively coupled to the first processor socket, the second processor socket, and the second information handling resource via respective Peripheral Component Interconnect Express lanes.

\* \* \* \* \*